United States Patent [19]
Matsui

[11] Patent Number: 5,383,944
[45] Date of Patent: Jan. 24, 1995

[54] METHOD FOR GASIFYING COMBUSTIBLE LIQUID AND POWDER BY USING GAS DETONATION WAVE

[75] Inventor: Hidenori Matsui, 2-9-57, Aoba-cho, Higashimurayama-shi, Japan

[73] Assignees: Koatsu Gas Koygo Co., Ltd., Osaka; Hidenori Matsui, Higashimurayama, both of Japan

[21] Appl. No.: 102,107

[22] Filed: Aug. 4, 1993

Related U.S. Application Data

[63] Continuation of Ser. No. 816,742, Jan. 2, 1992, abandoned.

[51] Int. Cl.⁶ .......................... F23B 7/00; C10J 3/46
[52] U.S. Cl. ............................... 48/197 R; 48/210; 48/211; 48/212; 48/DIG. 3; 48/DIG. 4; 422/128; 431/2; 431/11
[58] Field of Search ................... 48/210–212, 48/DIG. 8, DIG. 3, DIG. 4, 197 R; 422/127, 128; 431/1–2, 11

[56] References Cited

U.S. PATENT DOCUMENTS

| | | | |
|---|---|---|---|
| 2,376,479 | 5/1945 | Fehling | 48/DIG. 8 |
| 2,745,861 | 5/1956 | Bodine, Jr. | 422/127 |
| 2,925,335 | 2/1960 | Donath | 48/206 |
| 4,762,487 | 8/1988 | Zappa | 431/1 |
| 4,959,009 | 9/1990 | Hemsath | 431/1 |
| 4,968,244 | 11/1990 | Movassaghi | 431/1 |

OTHER PUBLICATIONS

Flame and Combustion Phenomena pp. 54–71, Bell et al ed. 1969.

*Primary Examiner*—James C. Housel
*Assistant Examiner*—Rachel Heather Freed
*Attorney, Agent, or Firm*—Koda and Androlia

[57] ABSTRACT

A method for gasifying a combustible liquid or powder using a gas detonation wave including a step of introducing detonable mixed gas including oxidizing gas into a detonation tube, a step of spraying, coating or laying combustible liquid or powder in the detonation tube and a step of detonating the mixed gas by ignition so that the combustible liquid or powder is thermally decomposed by the high-temperature and high-pressure behind the detonation wave.

4 Claims, 1 Drawing Sheet

METHOD FOR GASIFYING COMBUSTIBLE LIQUID AND POWDER BY USING GAS DETONATION WAVE

This is a continuation of application Ser. No. 816,742, filed Jan. 2, 1992 now abandoned.

BACKGROUND OF THE INVENTION

1. Field of the Invention

The present invention relates to a method for efficiently producing fuel gas or synthesis gas by gasifying combustible liquid or powder, that is, substances to be decomposed, such as fuel oil (crude oil, heavy oil, etc.), waste oil, plastics and coal, by use of gas detonation wave in a simple apparatus.

2. Prior Art

Various methods are available for decomposing and gasifying heavy oil: a method (thermal decomposition and coking method) for producing olefin gas (mainly composed of ethylene) and tar and pitch by reacting heavy oil with high-temperature gas (combustion gas or superheated water vapor at about 1,000° C.) at a high temperature in a short period, a method (high-temperature partial oxidation method) for partially oxidizing and gasifying heavy oil using water vapor and, a method for hydrodecomposing oil.

Regarding the methods for gasifying coal, various methods have been developed and used for many years since the end of the 19th century. Since these methods utilize thermal decomposition by heating, partial combustion by using air or, hydrodecomposition, they require catalysts and large-scale plants; thereby, causing problems in cost.

As described above, the conventional methods require large apparatuses and much investment in equipment. In addition, such methods also require much time and cost in operation and maintenance.

SUMMARY OF THE INVENTION

An object of the present invention is to provide a method for gasifying a combustible liquid or powder by using a simple compact apparatus which has a high reaction efficiency with a reaction period of less than 1/1000 sec, or so, per cycle and is easily maintained due to its simple structure.

The blasting method has been known as conventional technology which utilizes detonation wave. Solid or liquid explosives are most commonly used and their examples are TNT, dynamite, ANFO (Ammonia Nitrate fuel oil explosive) and nitroglycerine. The industrial use of a gas detonation wave is limited; however, a gas detonation wave is used only for detonation gun coating, non-electric delay blasting, gas source seismic profiler, etc. The gas detonation wave has been studied only to prevent explosion disasters. The idea of the present invention which thermally decomposes combustible substances using detonation wave has not yet been proposed.

The present invention focuses on the quick release (in less than 1/1,000 sec or so) of the high-temperature and high-pressure energy of detonation wave and is generally featured in that combustible substances are thermally decomposed and gasified quickly behind the detonation wave in a detonation tube.

The present invention is detailed below referring to the attached drawings.

DETAILED DESCRIPTION OF THE PREFERRED EMBODIMENT

Figure 1:
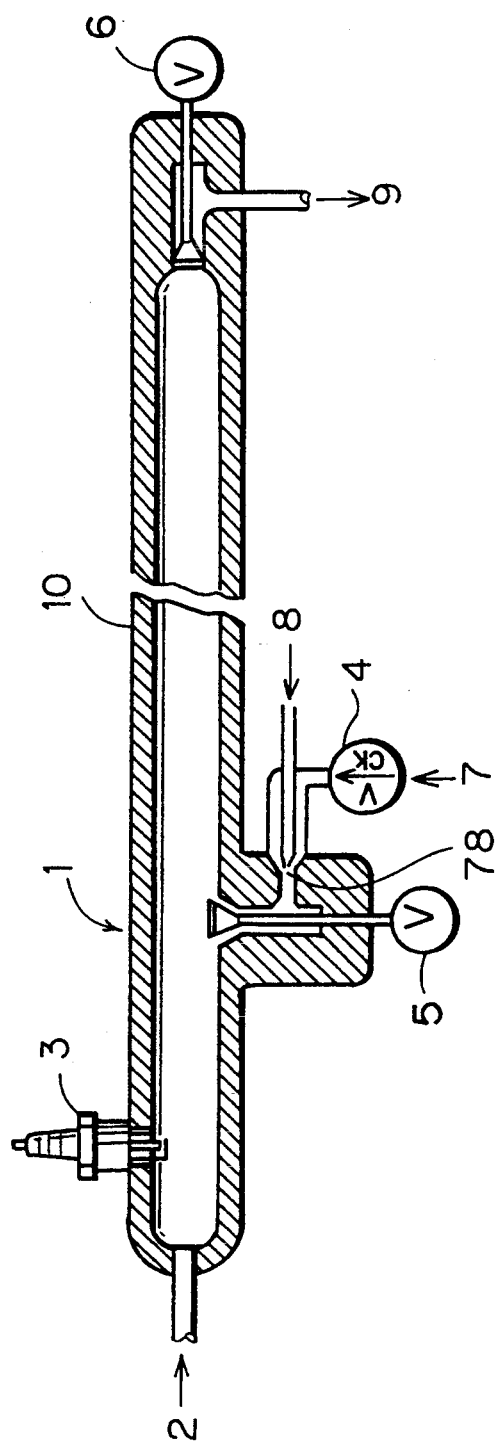
FIG. 1 is a front vertical sectional view of an embodied apparatus of the present invention.

Referring to FIG. 1 which shows a front vertical sectional view of an embodied apparatus of the present invention, the present invention relates to a method for gasifying combustible liquid or powder using a gas detonation wave and comprises a step of introducing detonable mixed gas including oxidizing gas into a detonation tube 1, a step of spraying, coating or laying combustible liquid powder in the detonation tube and a step of detonating the mixed gas by ignition so that the combustible liquid or powder is thermally decomposed by the high-temperature and high-pressure behind the detonation wave.

The above-mentioned oxidizing gas corresponds to the gas commonly referred to in the combustion technology and is mainly represented by air and oxygen. In the present invention, oxygen is preferably used to increase the reactivity of the gas mixture. However, other gases, such as chlorine gas, ozone and nitrous oxide, can also be used. The detonation tube 1 comprises a hermetically sealed main body 10 (a longitudinal container having a cylindrical, rectangular or other shape), a suction valve 5 for introducing a mixed gas of oxidizing gas and combustible gas, an oxidizing gas introduction passage 8, a combustible gas introduction passage 7 with a check valve 4, the above mixed gas being coaxially formed at an injection portion 78 and on/off-controlled by the suction valve 5, an introduction (spraying) nozzle 2 for introducing substances to be decomposed, an ignition plug 3 and a decomposed product gas exhaust passage 9 being on/off-controlled by an exhaust valve 6. It is a matter of course that the valves 5 and 6 are independently turned off (opened) at a pressure value less than a predetermined pressure value and turned on (closed) at a pressure value more than the predetermined value. Heavy oil, waste oil, coal, plastic powder being combustible in air or oxygen, as well as freon and PCB (polychrolinated biphenyl), being non-combustible in air but combustible in oxygen (in this case, oxygen must be used as oxidizing gas), can be used as substances to be decomposed.

Detonating mixed gas (oxygen and acetylene, or a part of decomposed products of hydrogen and carbon monoxide, for example) is introduced into the detonation tube (cylindrical or rectangular tube), a substance to be decomposed is then sprayed, coated or laid, and the mixed gas is ignited and detonated. Decomposed product gas (mixed gas mainly comprising carbon monoxide and hydrogen) is exhausted and collected by the over pressure in the detonation tube so that the gas remaining in the detonation tube 1 can be used as the fuel for the next reaction. For instance, a combustible gas is introduced via the introduction passage 7 for the first cycle, but is dispensed with for a second cycle because of a part of the decomposed product gas being used as a fuel for the combustible product gas. Since one reaction cycle ends within a short period of less than 1/1,000 sec or so, this cycle is repeated a plurality of times quickly in the detonation tube. This ensures efficient decomposition and gasification of combustible liquid or powder using a simple apparatus.

EMBODIMENT

The preferred embodiment of the present invention is described below referring to FIG. 1.

The detonation tube 1 is a reactor having the shape of a cylindrical tube, for example. Mixed gas comprising 10% of acetylene and 90% of oxygen is first introduced into the detonation tube 1 at the atmospheric pressure or higher pressure through the suction valve 5. The suction valve 5 is then closed (the exhaust valve 6 remains closed) and a proper amount of waste oil for example is sprayed into the detonation tube 1 from the introduction nozzle 2 which sprays substances to be decomposed. High voltage is applied to the ignition plug 3 to ignite the mixed gas using an electric spark plug. As a result, the mixed gas of acetylene and oxygen detonates easily and detonation wave propagates through the detonation tube 1 at supersonic velocity. At this time, the liquid or substance to be decomposed, suspended, laid or attached inside the detonation tube 1 immediately undergoes thermal decomposition due to the high temperature (2,000° C. or more) and high pressure (20 or more times the initial pressure) of the detonation wave, thereby obtaining decomposed product gas mainly comprising carbon monoxide and hydrogen. Table 1 shows the reaction conditions and the composition of the decomposed product gas when n-dodecane is used as a substance to be decomposed. Since the pressure of the decomposed product gas is far higher than that of the initial pressure of the mixed gas (because the molecular weight of the decomposed product gas is less than that obtained before the reaction and the gas is expanded due to high temperature), the over pressure is exhausted from the exhaust valve 6 to the outside of the detonation tube 1, and the gas is collected as product gas. Inside the detonation tube 1, generated gas still remains due to the residual pressure. The exhaust valve 6 is then closed and oxygen is introduced via the passage 8 into the detonation tube 1 from the suction valve 5. As a result, the mixed gas of the pre-decomposed gas and oxygen is obtained inside the detonation tube 1. The substance to be decomposed is sprayed again into the detonation tube 1 and the mixed gas is ignited. Detonation wave propagates again inside the detonation tube 1 and the substance to be decomposed is decomposed and gasified. By the repetition of this cycle, the substance to be decomposed is decomposed and gasified continuously. This cycle can be repeated more than several ten times per second by modifying the method of an internal combustion engine, such as a diesel engine.

In the above description, the decomposed product gas remaining in the detonation tube 1 is mixed gas mainly comprising carbon monoxide and hydrogen. The decomposed gas has expansion energy at the time of exhaustion. Assuming that the average temperature of the decomposed product gas is 2,000° C. for example, (273°+2,000° C.)/(273°+20° C.)=7.8, and also assuming that the molecular weight change of the gas is doubled, the pressure of the exhaust gas is about 15 kg/cm², if the initial pressure is equal to one atmosphere and the temperature is 20° C.

This expansion energy can also be collected as another power energy source (thrust force for example). In addition, since the detonation reaction propagates at 2,000 m/sec or more, one cycle reaction is completed within 1/1,000 sec or so when a detonation tube having a length of 2 m is used. However, the gas must be mixed uniformly beforehand in order to cause complete detonation. In actual practice, the use of a plurality of oxygen spraying nozzles 8 will be necessary. The number of reactions per second, therefore, depends on the method for spraying oxygen and the substance to be decomposed.

TABLE 1

| Reactant | | |
|---|---|---|
| Substance to be decomposed | n-dodecane | n-dodecane |
| Mixed gas for detonation | Acetylene 10% + Oxygen 90% | Acetylene 10% + Oxygen 90% |
| Initial pressure | 100 kPa | 200 kPa |
| Stoichiometrical ratio | 2.5 | 2.5 |
| Products | | |
| Hydrogen | 35.7% | 38.2% |
| Carbon monoxide | 46.3 | 47.9 |
| Methane | 2.6 | 3.0 |
| Acetylene | 1.0 | 0.2 |
| Oxygen | 0.6 | 0.3 |
| Carbon dioxide | 13.8 | 10.4 |
| Final pressure | 195 kPa | 425 kPa |
| Calorific value | 2,871 kcal/Nm³ | 2,934 kcal/Nm³ |

According to Table 1, CO and $H_2$ are the main components (amounting to more than 80%) of the decomposed product gas. Since the content of $CO_2$ is scarce, the decomposed gas can be used as a material for methanol synthetic gas.

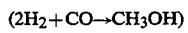

$$(2H_2 + CO \rightarrow CH_3OH)$$

Table 2 shows the detonable range of combustible gas in the oxidizing gas of the present invention, taking $H_2$, CO, CO+$H_2$ and $C_2H_2$ as examples of combustible gas.

TABLE 2

| Oxidant | In air | In oxygen |
|---|---|---|
| Combustible gas | | |
| $H_2$ | 18 to 59% | 15 to 90% |
| CO | — | 38 to 90% |
| CO + $H_2$ | 19 to 59% | 17 to 91% |
| $C_2H_2$ | 4.2 to 50% | 3.5 to 92% |

Since the present invention uses gas detonation wave as described above, high temperature and high pressure, which cannot be obtained by ordinary methods, can be attained easily. Since the high temperature and high pressure are used to decompose combustible substances, the following effects can be obtained.

(i) Combustible liquid or powder can be decomposed and gasified efficiently by using a compact simple apparatus.

(ii) The processing performance of the apparatus can be increased easily by using a plurality of detonation tubes.

(iii) Even if a substance to be decomposed is a thermostable and harmful substance (PCB for example), it can be decomposed, gasified safely and made harmless.

(iv) Heat is generated during decomposition. By exchanging and collecting this heat, the energy efficiency of the method can be further increased.

(v) The generated decomposed gas has expansion energy at the time of exhaust. This power energy can be collected as thrust force.

I claim:

1. A method for gasifying combustible liquid or powder using a gas detonation wave comprising:
   a step of introducing a detonable mixed gas comprising a uniform mixture of a combustible gas and an oxidizing gas into a detonation tube at a pressure equal to or greater than atmospheric pressure, said combustible gas and oxidizing gas being provided in amounts within a detonable range;
   a step of spraying, coating or laying the combustible liquid or powder in the detonation tube; and
   a step of only detonating said mixed gas by ignition to produce a supersonic detonation wave which propagates through the detonation tube to thermally decompose the combustible liquid or powder by high-temperature of at least 2000° C. and high-pressure of at least 20 times atmospheric pressure behind the detonation wave.

2. A method as in claim 1, wherein the decomposed gas produced by detonation is exhausted and collected by an over pressure inside said detonation tube.

3. A method for continuously gasifying combustible liquid or powder using a gas detonation wave comprising:
   an initial detonation cycle which includes:
      a step of introducing a detonable mixed gas comprising a uniform mixture of a combustible gas and an oxidizing gas into a detonation tube at a pressure equal to or greater than atmospheric pressure, said combustible gas and oxidizing gas being provided in amounts within a detonable range;
      a step of spraying, coating or laying the combustible liquid or powder in the detonation tube;
      a step of only detonating said mixed gas by ignition to produce a supersonic detonation wave to thermally decompose the combustible liquid or powder by high-temperature of at least 2000° C. and high-pressure of at least 20 times atmospheric pressure behind the detonation wave; and
      a step of exhausting and collecting all but a part of decomposed gas produced by detonation by an over pressure inside the detonation tube; and
   a subsequent detonation cycle which includes:
      a step of introducing an oxidizing gas alone into the detonation tube to form a second detonable mixed gas with the part of decomposed gas in amounts within a detonable range;
      a step of spraying, coating or laying the combustible liquid or powder into the tube; and
      a step of only detonating said mixed gas by ignition to produce a supersonic detonation wave to thermally decompose the combustible liquid or powder by a high-temperature of at least 2000° C. and high-pressure of at least 20 times atmospheric pressure behind the detonation wave.

4. A method as in claim 3, wherein the number of times the subsequent detonation cycle is repeated at least ten cycles per second.

* * * * *